(12) United States Patent
Charles et al.

(10) Patent No.: US 7,248,891 B2
(45) Date of Patent: Jul. 24, 2007

(54) METHOD OF MANAGING A COMMUNICATION WITH MULTI-SERVER SERVICE PROVIDING MEANS

(75) Inventors: Olivier Charles, Paris (FR); Jean-Michel Combes, Issy les Moulineaux (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/497,355

(22) PCT Filed: Dec. 2, 2002

(86) PCT No.: PCT/FR02/04132

§ 371 (c)(1),
(2), (4) Date: Feb. 16, 2005

(87) PCT Pub. No.: WO03/049406

PCT Pub. Date: Jun. 12, 2003

(65) Prior Publication Data

US 2005/0130681 A1 Jun. 16, 2005

(30) Foreign Application Priority Data

Dec. 3, 2001 (FR) .................................. 01 15605

(51) Int. Cl.
*H04Q 7/20* (2006.01)
(52) U.S. Cl. ............... 455/525; 455/436; 455/439; 455/453; 455/461; 370/355; 370/392
(58) Field of Classification Search ............... 370/349, 370/389, 392, 355, 500, 478; 455/436, 439, 455/442, 500, 524, 507, 453, 440, 740, 525
See application file for complete search history.

(56) References Cited

U.S. PATENT DOCUMENTS

| 5,325,362 | A | * | 6/1994 | Aziz ........................ 370/405 |
| 5,708,655 | A | | 1/1998 | Hall |
| 5,742,598 | A | | 4/1998 | Stern |
| 5,918,016 | A | * | 6/1999 | Brewer et al. ............ 709/220 |
| 6,038,449 | A | * | 3/2000 | Corriveau et al. ......... 455/439 |

(Continued)

FOREIGN PATENT DOCUMENTS

WO    WO 01 19053    3/2001

*Primary Examiner*—William Trost
*Assistant Examiner*—James D Ewart
(74) *Attorney, Agent, or Firm*—Oliff & Berridge, PLC

(57) ABSTRACT

The invention relates to a method of managing a call through a telecommunications network (10) between an access terminal (18) connected to the network (10) and means (22) for providing a service through the network. Said means comprise firstly a multiplicity of terminals (24, 26) connected to the network, said terminals forming servers suitable for providing the service, and secondly means (28) for selecting amongst said multiplicity of servers (24, 26) the server that is best suited for providing the service to the access terminal (18). The call is also set up using a communications protocol enabling some terminals to be mobile by allocating each mobile terminal a main address that is invariable regardless of its point of connection to the network and by forwarding all of the data sent to said main address to the corresponding terminal. A common main address is allocated to the service provider means (22), and all of the data sent to the main address is forwarded to the server (24, 26) selected as being the best suited for providing said service.

11 Claims, 2 Drawing Sheets

U.S. PATENT DOCUMENTS

| | | | |
|---|---|---|---|
| 6,400,722 B1* | 6/2002 | Chuah et al. | 370/401 |
| 6,470,389 B1 | 10/2002 | Chung | |
| 6,691,227 B1* | 2/2004 | Neves et al. | 713/162 |
| 6,771,609 B1* | 8/2004 | Gudat et al. | 370/254 |
| 6,842,462 B1* | 1/2005 | Ramjee et al. | 370/466 |
| 6,988,146 B1* | 1/2006 | Magret et al. | 709/238 |
| 7,085,581 B2* | 8/2006 | Vanghi | 455/522 |
| 2001/0036834 A1* | 11/2001 | Das et al. | 455/458 |
| 2001/0046223 A1* | 11/2001 | Malki et al. | 370/338 |
| 2002/0039367 A1* | 4/2002 | Seppala et al. | 370/401 |
| 2002/0049059 A1* | 4/2002 | Soininen et al. | 455/439 |
| 2002/0057657 A1* | 5/2002 | La Porta et al. | 370/331 |
| 2002/0071446 A1* | 6/2002 | Khafizov et al. | 370/442 |
| 2002/0131386 A1* | 9/2002 | Gwon | 370/338 |
| 2002/0147820 A1* | 10/2002 | Yokote | 709/229 |
| 2002/0154627 A1* | 10/2002 | Abrol et al. | 370/352 |
| 2003/0045293 A1* | 3/2003 | Lee et al. | 455/442 |
| 2003/0076814 A1* | 4/2003 | Gurivireddy et al. | 370/352 |
| 2003/0091030 A1* | 5/2003 | Yegin et al. | 370/352 |
| 2004/0024901 A1* | 2/2004 | Agrawal et al. | 709/238 |
| 2004/0095932 A1* | 5/2004 | Astarabadi et al. | 370/389 |

* cited by examiner

METHOD OF MANAGING A COMMUNICATION WITH MULTI-SERVER SERVICE PROVIDING MEANS

The present invention relates to a method of managing a call through a telecommunications network including points of connection, between an access terminal connected to the network and means for providing a service through the network, said means comprising firstly a multiplicity of terminals connected to the network, said terminals forming servers suitable for providing the service, and secondly means for selecting amongst said multiplicity of servers the server that is best suited for providing the service to the access terminal. The call is set up using a communications protocol enabling some terminals to be mobile by allocating each mobile terminal a main address that is invariable regardless of its point of connection to the network and by forwarding all of the data sent to said main address to the corresponding terminal.

Such a method is implemented, for example, when it is desired to propose a service that is liable to be in demand simultaneously by a large number of users. This applies in particular if the service is made available on a web site via a telecommunications network such as the Internet. In order to facilitate access to the service, the service provider has a multiplicity of terminals acting as servers, all connected to the Internet and geographically dispersed.

The service on offer may be constituted, for example, by a name resolving service, a data enciphering service, or a document printing service.

However, when a user seeks to enter into communication with one of the servers in order to access the service, the call is intercepted by a load sharer constituted by a terminal whose function is to select from the multiplicity of servers, the server which is best suited to provide the service to the user. In general, the best suited server is selected using criteria of proximity or of congestion. Thereafter, the load sharer redirects the call to the selected server.

Known communications protocols enable the integrity and the security of calls between an identified sender and receiver to be ensured, even if one of them is a mobile terminal and changes its point of connection to the network while the call is in progress. However, integrity and security are not ensured when the final receiver, in this case the selected server, is not identified as soon as the call is set up.

Thus, the integrity and the security of information exchanges are not guaranteed when one of the parties is constituted by service provider means comprising a multiplicity of servers, since any call to any one of those servers begins by passing as a call to the load sharer.

The invention seeks to remedy the drawbacks of existing methods by providing a method of managing a call that makes it possible to ensure the security and integrity of information exchanges between an access terminal and a server selected from a multiplicity of servers suitable for providing the requested service.

The invention thus provides a method of managing a call of the above-specified type, characterized in that a common main address is allocated to the service provider means, and in that all of the data sent to the main address is forwarded to the server selected as being the best suited for providing said service.

Thus, regardless of which server is currently selected for the service, the call is set up between the access terminal and a virtual server that does not vary and that is identified by the main address. The sender and the receiver are thus clearly identified as soon as the call is set up and continue to be identified throughout its duration. Conventional communication protocols, such as "Mobile IPv6" enable mechanisms to be implemented that ensure the security and the integrity of information exchanges during such a call. One such mechanism, for example, is the "IPsec" protocol.

The method of the invention for managing a call may also comprise one or more of the following characteristics:

in the communications protocol, a temporary address is allocated to each mobile terminal locating its point of connection to the network at all times, and a temporary address is also allocated to the service provider means corresponding at all times to the main address of the server that is selected as being the best suited to provide said service while the call is in progress;

the selector means select the server that is best suited for providing said service as soon as they are invoked by a triggering event;

the setting up of the call between the access terminal and the service provider means constitutes a triggering event;

the access terminal is a mobile access terminal and displacement of the mobile access terminal from a first connection point to a second connection point of the telecommunications network while a call is in progress constitutes a triggering event; and the server that is best suited for providing said service is the server that is nearest to the access terminal.

The invention will be better understood from the following description given purely by way of example and made with reference to the accompanying drawings, in which.

Figure 1:
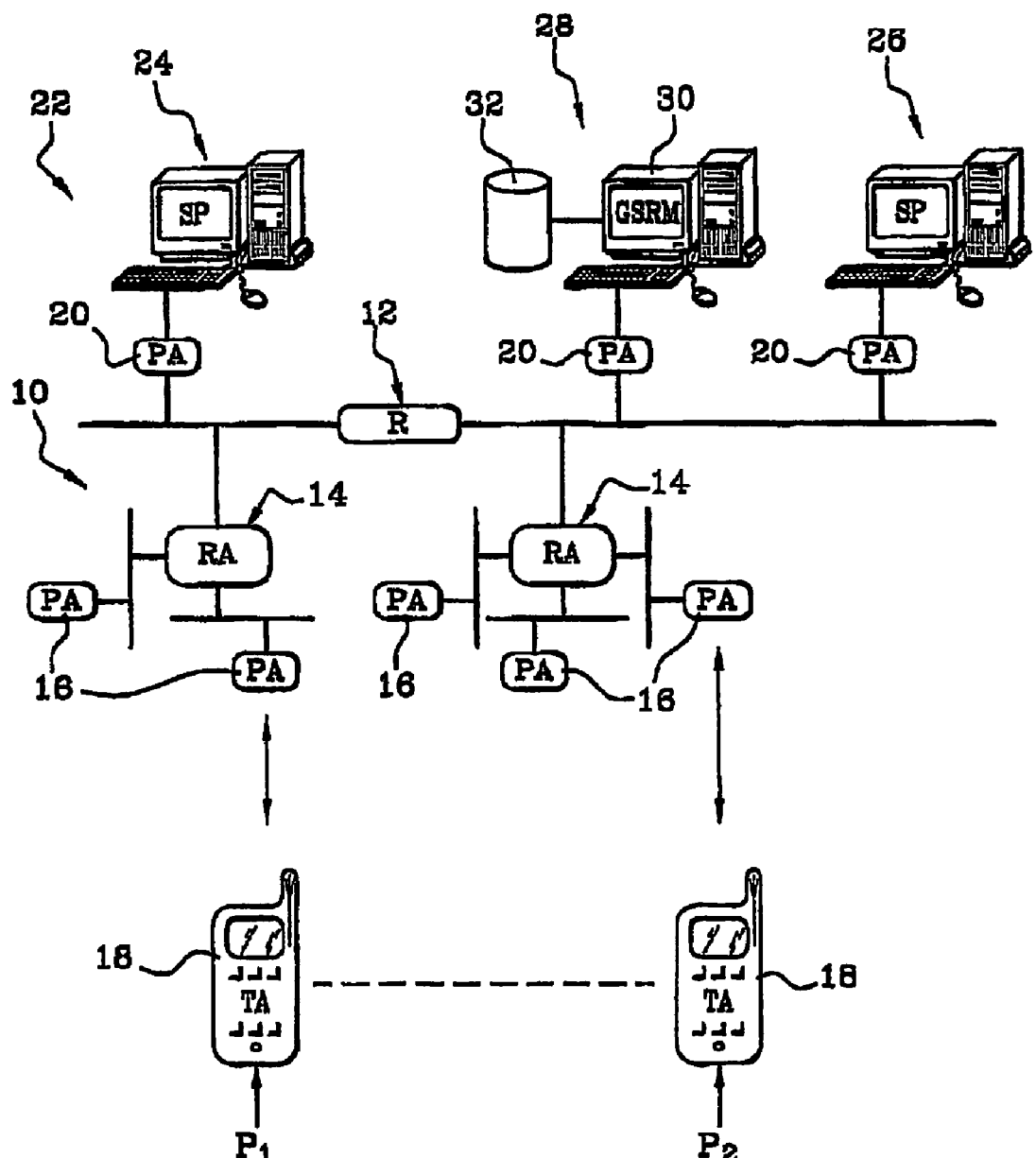
FIG. 1 is a diagram of the general structure of a system for implementing a method of the invention for managing a call.

The system shown in FIG. 1 comprises a telecommunications network 10 such as the Internet. In conventional manner, the network comprises routers such as the router 12 that enable local networks to be interconnected. It also comprises access routers such as routers 14 that enable connections to be made to points for connection to the Internet 10.

Certain network connection points, such as connection points 16, are constituted, for example, by transceiver antennas enabling mobile access terminals such as a mobile terminal 18 to access the Internet 10 by radiowaves in compliance with the IEEE 802.11 standard, for example. Other connection points, such as wire connection points 20, enable terminals such as personal computers to connect to the Internet 10.

The system further includes means 22 for providing a service via the Internet 10.

These means comprise a plurality of terminals 24, 26, two of which are shown in the figure. They are connected to the Internet 10 via wire connection points 20, and they constitute servers adapted to providing the service.

Furthermore, the service provider means 22 include selector means 28, also connected to the Internet 10 via a wire connection point 20. These selector means 28 comprise a server 30 for managing calls between the mobile terminal 18 and the service provider means 22, and storage means 32 for storing information relating to the servers 24 and 26. The call manager server 30 manages calls using a communications protocol that enables some terminals to be mobile by giving each of them a main address that is invariable regardless of its point of connection to the Internet 10, and a temporary address locating the point of connection of the call to the network at all times. The communications protocol may be constituted, for example, by the "Mobile IPv6" protocol or by any other known analogous communications protocol.

In the description below, it is assumed that the communications protocol used is the "Mobile IPv6" protocol. In this protocol, when one of two terminals changes its point of connection to the network 10 while a call is in progress, it warns the other terminal of its movement, by sending to it the address of a new connection point in a message known as a binding update (BU) message. In response, the other terminal sends a binding acknowledge (BA) message.

In addition, in this protocol, the mobile terminal 18 is identified by a main address that is invariable regardless of its point of connection to the Internet 10, and it is located by a temporary address which depends on its connection point. Thus, when the mobile terminal 18 is in a first position $P_1$, accessing the network 10 via a first connection point 16, the system provides it with a first temporary address, and when the mobile terminal 18 changes position, e.g. while a call is in progress, so as to occupy a position $P_2$ from which it accesses the network 10 via a second connection point 16, the system gives it a second temporary address.

The main and temporary addresses of mobile terminals are managed by mobile terminal managing servers dispersed through the network 10 (not shown).

Like the mobile terminal 18, the means 22 for providing a service are identified in unique manner by a main address and they are localized by a temporary address that is determined by the call manager server 30 and that corresponds to the main address of the server 24, 26 that is best suited to provide the service to the mobile terminal 18.

The selection server 30 also performs a conventional server function of managing mobile terminals. It intercepts all messages going to the main address of the service provider means 22 and forwards these messages to the selected temporary address of said service provider means 22, i.e. to the server that has been selected to provide the service.

Thus, everything takes place as though the service provider means 22 were mobile, and as though, at each instant during a call, said means were located at the location of one or other of the servers 24 and 26.

The database 32 stores information enabling the call management server 30 to select the server 24, 26 that is best suited for providing the service. For example, the selection criterion retained might be a criterion of proximity to the mobile terminal 18. In which case, while the call is being set up or while it is in progress, the call manager server 30 selects the server 24, 26 that is closest to the mobile terminal 18 so as to improve quality of service.

To do this, the database 32 includes a certain number of records. Each record has three fields. A first field contains the main address of the service provider means 22, a second field contains information locating a point giving connection to the network 10 or to a sub-network of the network 10, and a third field includes the main address of one of the servers 24, 26 suitable for providing the service.

Such a record is interpreted as follows: when an access terminal, such as the mobile terminal 18, seeks to access a service made available by the means 22 identified in the first field, from a point of connection or from a sub-network whose location corresponds to the second field, the call manager server 30 needs to put it into communication with the server identified by the third field.

The selection criterion might equally well be a congestion criterion relating to which servers are available for providing the service. Under such circumstances, the records could include information relating to the congestion of each of the servers suitable for providing service, said information being updated regularly by the call manager server 30.

Nevertheless, the description below deals only with the geographical selection criterion.

The operation of the system described above is described below with reference to FIGS. 2 and 3.

Figure 2:
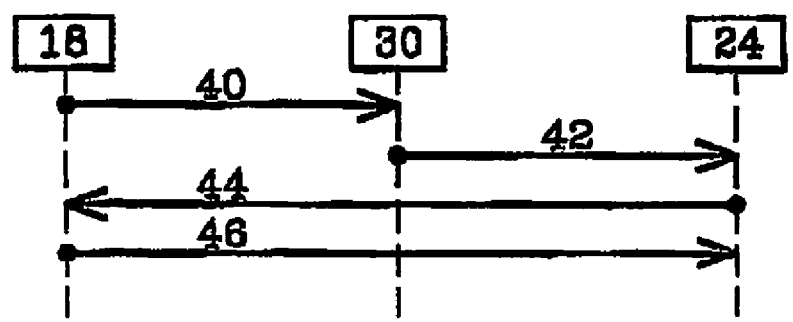
FIG. 2 shows a succession of steps in setting up a call using the method implemented in FIG. 1.

FIG. 2 shows the method implemented by the above-described system while setting up a call between the mobile terminal 18 and the service provider means 22.

In a first step 40, during which a user of the mobile telephone 18 seeks to address the service, the mobile telephone transmits a request from its position $P_1$ towards the main address of the service provider means 22. This request is thus intercepted by the call manager server 30.

During the following step 42, the call manager server 30 determines the location of the mobile terminal 18. It compares this location information with the second fields of each of the records stored in the database 32 and it returns the address of the nearest server, e.g. the server 24. The call manager server 30 then redirects the request to the server 24.

Thereafter, during a step 44, as soon as the server 24 has received the request from the mobile terminal 18, it sends a BU message to inform it that it is located at the temporary address defined by its main address.

Finally, during a last step 46, the mobile terminal 18 sends an acknowledgment in the form of a BA message to inform the service provider means 22 that it has become aware of the new position thereof.

Figure 3:
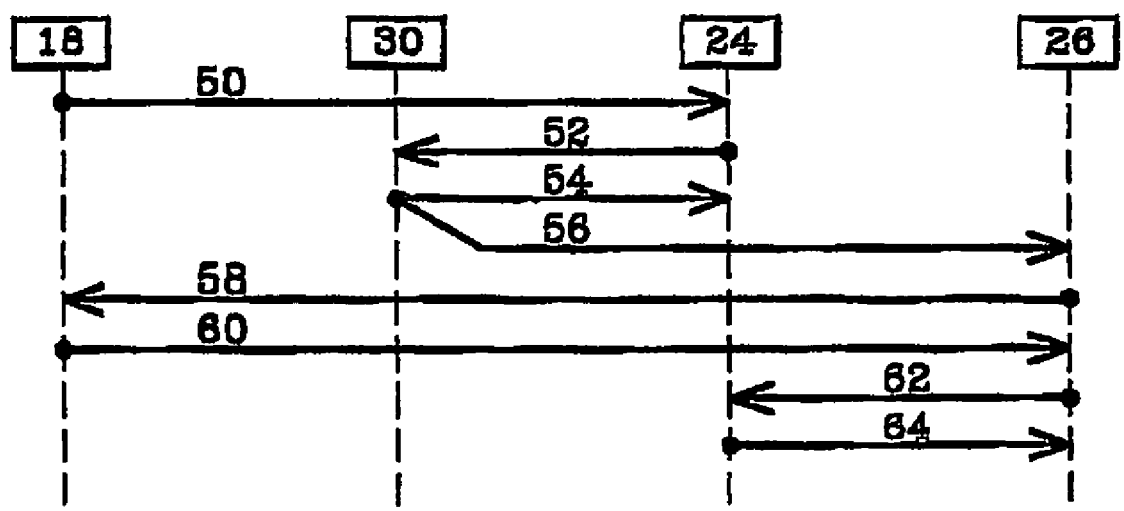
FIG. 3 shows a succession of steps in managing a call that is in progress, using the method implemented in FIG. 1.

During displacement of the mobile terminal 18 from the first position $P_1$ to a second position $P_2$ while a call is in progress, the call managing method shown in FIG. 3 comprises a first step 50 during which the server 24 receives a message from the mobile terminal 18 and detects in the message that the mobile terminal 18 has moved.

During the following step 52, the server 24 transmits the information relating to the new position of the mobile terminal 18 to the call manager server 30. As before, this server compares the new location with the records stored in the database 32. Thereafter it selects the nearest server.

If the selected server is the same as the preceding server, i.e. if it is the server 24, then the method moves onto a step 54 during which the call manager server 30 informs the server 24 that it remains the server the best suited to provide the service to the client. The call can therefore continue.

If the selected server is different from the preceding server 24, e.g. the server 26, then the method moves onto a step 56. During step 56, the call manager server 30 sends a message to the newly-selected server 26, containing the main address of the mobile terminal 18.

During the following step 58, the newly-selected server 26 sends a BU message to the mobile terminal 18 to inform it that the service provider means 22 have moved and that the temporary address thereof is, henceforth, the main address of the new server 26.

During the following step 60, the mobile terminal 18 acknowledges receipt of this modification by sending a BA message to the service provider means 22.

Finally, during a validation step 62, the new server 26 warns the old server 24 that the mobile terminal 18 has indeed registered the displacement of the service provider means 22.

In response, during a last step 64, the old server 24 sends to the new server 26 a list of all of the tasks waiting to be processed for the mobile terminal 18, together with the information needed to enable performance of the service to be taken over by the new server 26. Thereafter it stops performing the service. Henceforth it is the new server 26 that continues with performance of the service requested by the user.

From the point of the view of the user's mobile terminal 18, everything takes place as though the service provider means 22 were constituted by a mobile server moving as a function of displacements of the mobile terminal 18 so as to optimize the provision of service.

In particular, the change of server during a call is considered, from the points of view of the servers managing mobile terminals and the network 10, as a displacement of a mobile terminal. Consequently, the integrity and the security of information exchanged during the call are provided by any known communications protocol that allows for terminals to be mobile, such as the Mobile IPv6 protocol.

It can clearly be seen that a method of handling a call as described above enables access to be given to a service provided by a multiplicity of servers without passing via an address translator, and thus without endangering the integrity and the security of the information that is exchanged.

The invention claimed is:

1. A method of managing a call through a telecommunications network including points of connection, between an access terminal connected to the network and means for providing a service through the network, said means comprising firstly a plurality of terminals connected to the network, said terminals forming servers suitable for providing the service, and secondly a call manager server capable of selecting amongst said plurality of servers the server that is best suited for providing the service to the access terminal, the call being set up using a communications protocol enabling some terminals to be mobile by allocating each mobile terminal a main address that is invariable regardless of the mobile terminal's point of connection to the network and a temporary address which depends on said mobile terminal's point of connection and by forwarding all of the data sent to said main address to the mobile terminal, the method comprising a step of allocating to the service provider means a common main address, that is invariable, and a temporary address, and steps, executed by the call manager server, of intercepting all of the data sent to said common main address and redirecting the intercepted data to the server selected as being the best suited for providing said service and whose main address is used as a temporary address for the service provider means.

2. The method of managing a call according to claim 1, wherein, following the step of redirecting data to the selected server, the method comprises a step of transmitting, from the selected server to the access terminal, a message to inform the access terminal that the temporary address of the service provider means is the main address of the selected server.

3. The method of managing of a call according to claim 1, wherein, when during a communication with an access terminal, the call manager server executes step of selecting a new server, distinct from a server, that was previously selected during the same communication, the method comprises:
    a step of transmitting of the main address of the access terminal from the call manager server to the newly-selected server,
    a step of transmitting, from the newly-selected server to the access terminal, a message to inform the access terminal that the temporary address of the service provider means is the main address of the newly-selected server.

4. The method of managing a call according to claim 3, wherein the method comprises:
    a step of transmitting from the previously-selected server to the newly-selected server of information needed to enable performance of the service to be taken over by the newly-selected server,
    a step of stopping the performance of the service executed by the previously-selected server,
    a step of continuing with performance of the service executed by the newly-selected server.

5. The method of managing a call according to claim 1, wherein the step of selecting, by the call manager server, the server that is best suited for providing said service is launched as soon as the call manager server is invoked by a triggering event.

6. The method of managing a call according to claim 5, wherein setting up of the call between the access terminal and the service provider means constitutes a triggering event.

7. The method of managing a call according to claim 5, wherein the access terminal is a mobile access terminal and displacement of the mobile access terminal from a first connection point to a second connection point of the telecommunications network while a call is in progress constitutes a triggering event.

8. The method of managing of a call according to claim 7, wherein when during a communication with an access terminal, the selected server detects that the mobile terminal has moved from a point of connexion to another, the method comprises a step of transmitting from the selected server to the call manager server, information relating to the new position of the mobile terminal.

9. The method of managing of a call according to claim 5, wherein the server that is best suited for providing said service is the server that is nearest to the access terminal.

10. The method of managing of a call according to claim 9, wherein when during a communication with an access terminal, the selected server detects that the mobile terminal has moved from a point of connexion to another, the method comprises a step of transmitting from the selected server to the call manager server, information relating to the new position of the mobile terminal.

11. Call manager server for managing a call through a telecommunications network including points of connection, between an access terminal connected to the network and means for providing a service through the network comprising a plurality of terminals forming servers suitable for providing the service, the call being set up using a communication protocol enabling some terminals to be mobile by allocating each mobile terminal a main address that is invariable regardless of the mobile terminal's point of connection to the network and a temporary address which depends on said mobile terminal's point of connection and by forwarding all of the data sent to said main address to the mobile terminal, the server being configured to select amongst a plurality of servers the server that is best suited for providing the service to the access terminal, wherein the service provider means possesses a common main address, that is invariable, and a temporary address, wherein the call manager comprises means for intercepting all of the data sent to said common main address and means for forwarding these data to the server selected as being the best suited for providing said service whose main address is used as a temporary address for the service provider means.

* * * * *